(12) United States Patent
Johnson et al.

(10) Patent No.: US 10,579,969 B2
(45) Date of Patent: Mar. 3, 2020

(54) TECHNIQUES FOR MANAGING CALENDAR INVITES RECEIVED FROM DIFFERENT MESSAGING SERVICES

(71) Applicant: Dropbox, Inc., San Francisco, CA (US)

(72) Inventors: Maxwell Johnson, San Francisco, CA (US); Belinda Preno, San Francisco, CA (US); Matthew Dierker, Champaign, IL (US)

(73) Assignee: Dropbox, Inc., San Francisco, CA (US)

( * ) Notice: Subject to any disclaimer, the term of this patent is extended or adjusted under 35 U.S.C. 154(b) by 998 days.

(21) Appl. No.: 14/577,925

(22) Filed: Dec. 19, 2014

(65) Prior Publication Data

US 2016/0042324 A1 Feb. 11, 2016

Related U.S. Application Data

(60) Provisional application No. 62/035,989, filed on Aug. 11, 2014.

(51) Int. Cl.
*G06Q 10/10* (2012.01)
*H04L 12/58* (2006.01)

(52) U.S. Cl.
CPC ....... *G06Q 10/1095* (2013.01); *G06Q 10/107* (2013.01); *H04L 51/046* (2013.01); *H04L 51/18* (2013.01)

(58) Field of Classification Search
CPC ....... H04L 51/046; H04L 51/08; H04L 51/18; G06Q 10/10; G06Q 10/1093; G06Q 10/1095; G06Q 10/109; G06Q 10/107
USPC .......................................................... 715/963
See application file for complete search history.

(56) References Cited

U.S. PATENT DOCUMENTS

| 6,463,463 | B1 * | 10/2002 | Godfrey | ............... | G06Q 10/107 709/206 |
| 8,417,782 | B2 | 4/2013 | Tendjoukian et al. | | |
| 8,429,292 | B2 | 4/2013 | Adams et al. | | |
| 2002/0083210 | A1 * | 6/2002 | Harrison | ................. | H04L 29/06 719/310 |
| 2006/0129444 | A1 * | 6/2006 | Baeza | .................. | G06Q 10/109 705/7.19 |

(Continued)

OTHER PUBLICATIONS

Sidney L. Smith and Jane N. Mosier "Guidelines for Designing User Interface Software" http://wireframe.vn/books/Usability/Smith_Mosier_guideline_.pdf (Year: 1986).*

(Continued)

*Primary Examiner* — Christine M Behncke
*Assistant Examiner* — Shelby A Turner
(74) *Attorney, Agent, or Firm* — DLA Piper LLP (US)

(57) ABSTRACT

Embodiments of the present invention improve the calendar invite experience by providing a unified interface for managing calendar invites, regardless of the originating calendar service/messaging provider. When a calendar invite is received, the relevant information (date, time, location, etc.) is parsed from the invite and presented to the user through a calendar invite user interface. The calendar invite user interface can include selectable icons or links allowing a user to accept/decline an invite. Invites are often sent in ICS files or as accept/decline links. Based on the user action, the appropriate message can be returned so that the calendars of the invitees and the organizer can be properly updated.

16 Claims, 12 Drawing Sheets

(56) References Cited

U.S. PATENT DOCUMENTS

| | | | | |
|---|---|---|---|---|
| 2007/0016646 A1* | 1/2007 | Tendjoukian | ........ | G06Q 10/109 709/206 |
| 2007/0079260 A1 | 4/2007 | Bhogal et al. | | |
| 2007/0220063 A1* | 9/2007 | O'Farrell | .............. | G06F 17/277 |
| 2007/0244976 A1* | 10/2007 | Carroll | ................. | G06Q 10/107 709/206 |
| 2008/0215426 A1* | 9/2008 | Guldimann | ............ | G06Q 30/02 705/14.61 |
| 2009/0040875 A1* | 2/2009 | Buzescu | ............ | G06Q 10/109 368/29 |
| 2009/0157466 A1 | 6/2009 | Bank et al. | | |
| 2010/0070877 A1* | 3/2010 | Scott | .................... | G06Q 10/109 715/751 |
| 2010/0322395 A1* | 12/2010 | Michaelis | ............ | G06Q 10/107 379/88.14 |
| 2011/0106892 A1* | 5/2011 | Nelson | ................. | G06Q 10/109 709/206 |
| 2012/0072500 A1* | 3/2012 | Greene | .................. | G06Q 10/10 709/206 |
| 2012/0278381 A1* | 11/2012 | Ferlitsch | .............. | G06Q 10/109 709/203 |
| 2012/0284637 A1* | 11/2012 | Boyer | .................. | G06Q 10/109 715/751 |
| 2014/0351744 A1* | 11/2014 | Jeon | ....................... | G06F 3/0482 715/781 |
| 2016/0086116 A1* | 3/2016 | Rao | .................. | G06Q 10/06311 705/7.21 |

OTHER PUBLICATIONS

"The Windows Interface Guidelines—A Guide for Designing Software", Microsoft Windows (Year: 1995).*

* cited by examiner

TECHNIQUES FOR MANAGING CALENDAR INVITES RECEIVED FROM DIFFERENT MESSAGING SERVICES

CROSS-REFERENCES TO RELATED APPLICATIONS

This application claims priority to U.S. Provisional Patent Application No. 62/035,989, filed Aug. 11, 2014, entitled "TECHNIQUES FOR MANAGING CALENDAR INVITES RECEIVED FROM DIFFERENT MESSAGING SERVICES," the disclosure of which is hereby incorporated in its entirety by reference for all purposes.

BACKGROUND

The present disclosure relates generally to electronic message management systems and services and in particular to techniques for managing calendar invitations received from different messaging services.

Calendar invites are typically sent by one user (an organizing user, or organizer) as a message through a messaging service (e.g., email) to a number of invited users (invitees). Depending on the messaging service used by each of the users (the meeting organizer and the invited users), the calendar invite can be handled differently. For example, between users of the same messaging service, the calendar invite can be handled natively by the messaging service application to update the recipient's calendar and respond to the organizer with the recipient's attendance status. However, users of different messaging services can use different messaging service applications which may not handle calendar invites natively. For example, the recipient user may be forced to exit the messaging service application and open a calendar application to add the invite to their calendar and respond with an attendance status. This may generally result in a poor user experience.

SUMMARY

The present disclosure relates generally to techniques for managing calendar invitations received from different messaging services. Calendar invitations (also referred to herein as "invites") sent by one type of email client are often poorly handled by different types of email clients. For example, when a user views a calendar invite sent through Gmail™ (a service of Google Inc.) through a non-Gmail email client and the user tries to respond to the invite (e.g., accept), the user is taken to a Gmail login screen. Similarly poor user experiences may also be experienced when using other calendar service providers. For example, invites from other providers can require the user to download a calendar invite file and open the invite file in a separate app (such as a calendar app) and then accept/decline the invite through the separate app.

Embodiments of the present invention improve the calendar invite experience by providing a unified interface for managing calendar invites, regardless of the originating calendar service/messaging provider. When a calendar invite is received, the relevant information (date, time, location, etc.) is extracted from the invite and presented to the user through a calendar invite user interface. The calendar invite user interface can include selectable icons or links allowing a user to accept/decline an invite. Invites are often sent in ICS files or as accept/decline links. Based on the user action, the appropriate message can be returned so that the calendars of the invitees and the organizer can be properly updated.

Certain embodiments relate to methods for managing calendar invites received from different calendar services. A message management service can receive a calendar invite message from a messaging service or a calendar service. The message management service can parse the calendar invite file based on a format associated with the messaging service to identify invitation details. The message management service can send the invitation details to a client device to be displayed and can receive a response from the client device indicating an attendance status. The message management service can provide a calendar response message based on the attendance status to the messaging service or calendar service.

Certain embodiments relate to message management services and systems. One example of a message management system can include a client interface configured to communicate with one or more client devices operable by a user and a messaging service interface configured to receive calendar invites for the user from two or more messaging services and/or calendar services. The calendar invites can be processed by various message management modules, including an event module, an event handler, and a calendar interface. The message management service can also include an event format cache that maintains information used to parse calendar invites having different formats, and an event cache that maintains an attendance status for calendar invites received for the user. Based on the attendance status indicated by the user, the event handler can generate an appropriate calendar response message and return it to the originating messaging service or calendar service.

Certain embodiments relate to methods for interacting with calendar invites received from different calendar services. A client device can receive a calendar invitation a message management service and can display the calendar invitation in a first interface on the client device. The client device can then receive a selection of an attendance status through the first interface. In response to the selection, a second interface can be displayed on the client device and a selection of attendance data can be received through the second interface on the client device. The client device can then send a calendar response including the attendance status and the selection of attendance data to the message management service.

The following detailed description together with the accompanying drawings will provide a better understanding of the nature and advantages of the present invention.

DETAILED DESCRIPTION

The present disclosure relates generally to techniques for managing calendar invitations received from different messaging services. Calendar invitations (also referred to herein as "invites") sent by one type of email client are often poorly handled by different types of email clients. For example, when a user views a calendar invite sent through Gmail™ (a service of Google Inc.) through a non-Gmail email client and the user tries to respond to the invite (e.g., accept), the user is taken to a Gmail login screen. Similarly poor user experiences may also be experienced when using other calendar service providers. For example, invites from other providers can require the user to download a calendar invite file and open the invite file in a separate app (such as a calendar app) and then accept/decline the invite through the separate app.

Embodiments of the present invention improve the calendar invite experience by providing a unified interface for managing calendar invites, regardless of the originating calendar service/messaging provider. When a calendar invite is received, the relevant information (date, time, location, etc.) is extracted from the invite and presented to the user through a calendar invite user interface. The calendar invite user interface can include selectable icons or links allowing a user to accept/decline an invite. Invites are often sent in ICS files or as accept/decline links. Based on the user action, the appropriate message can be returned so that the calendars of the invitees and the organizer can be properly updated.

Figure 1:
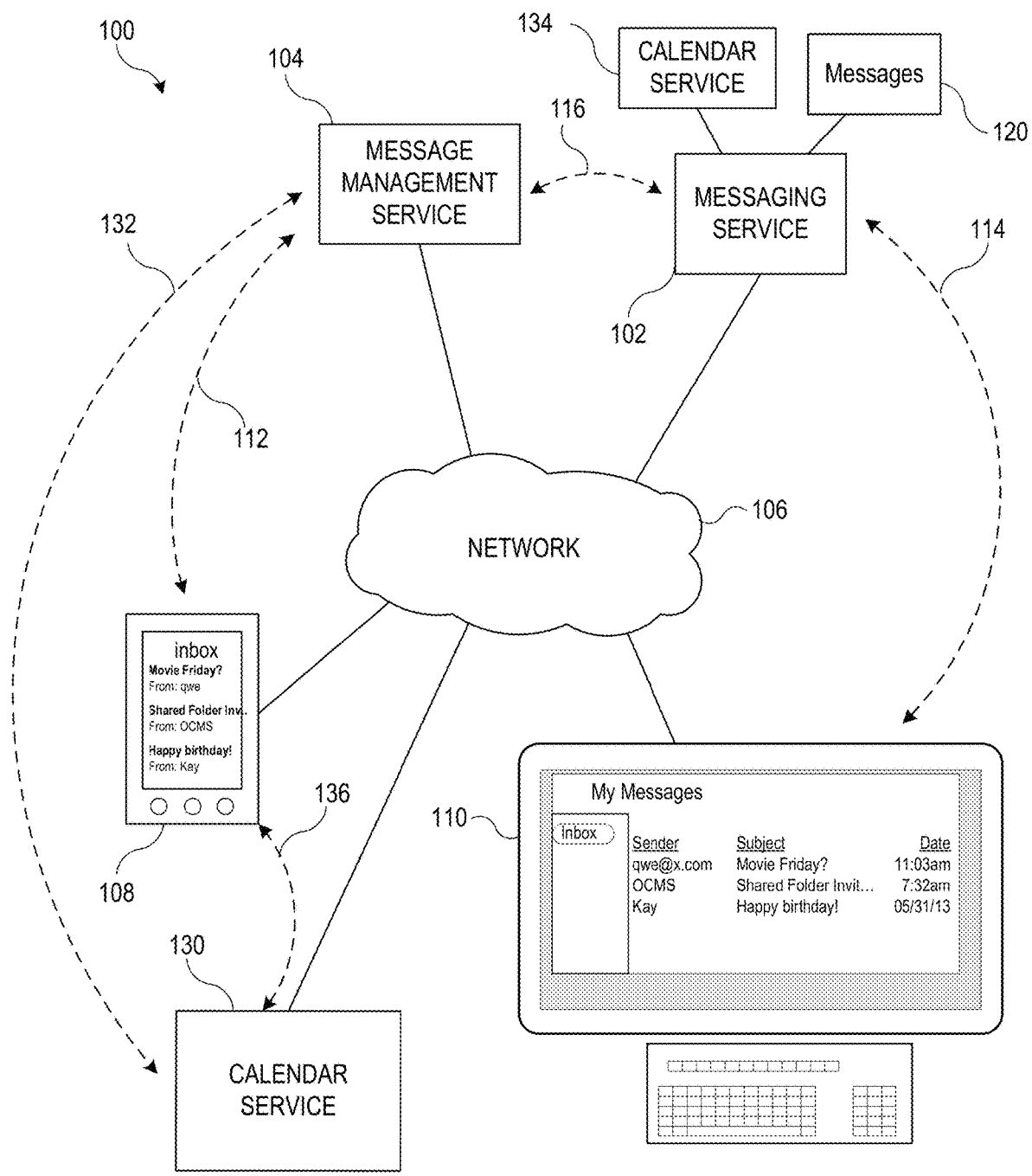
FIG. 1 shows a block diagram of a communication system according to an embodiment of the present invention.

FIG. 1 shows a block diagram of a communication system 100 according to an embodiment of the present invention. Communication system 100 can include a messaging service 102, a message management service 104, and online content management service 130 connected to a network 106. Also connected to network 106 can be various clients 108, 110 that can be used to access messaging service 102, a calendar service 130, and/or message management service 104. In this example, client 108 accesses message management service 104 (as indicated by dashed arrow 112) while client 110 accesses messaging service 102 (as indicated by dashed arrow 114).

Calendar service 130 can include, for example, an event scheduling service, a calendar graphical user interface, a social media service that allows users to post updates related to invitations and/or other content, and so on. Calendar service 130 can be hosted on servers maintained by a service provider and accessed via a network 106, such as the Internet. In some embodiments, calendar service 130 can be accessed by a user through a calendar application executing on a client device or through a web-based client interface (e.g., accessible through a web browser). In some embodiments, a calendar service can be provided by and/or associated with a messaging service. For example, messaging service 102 can provide calendar service 134 to handle calendar events and maintain a calendar for a user. When an event organizer creates a new event using calendar service 134, the event can be sent to one or more recipients through messaging service 102.

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo! ® Mail (a service of Yahoo! Inc.). Other examples can include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and client 108, as indicated by dashed arrows 112, 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, a calendar invite can be generated by calendar service 134 at the request of an organizing user. Calendar service 134 can receive invitation details (time, date, location, invitees, etc.) from the organizing user and generate a calendar invite file (such as an iCalendar file or other calendar file). Messaging service 102 can receive the calendar invite from calendar service 134 and generate a calendar invite message to be sent to each invitee. The calendar invite message can include the calendar invite file and can be configured to cause a receiving messaging client application to display a user interface through which the invitee can view the invitation details and provide an attendance status in response. In some embodiments, the calendar invite message can include the invitation details in a human readable format (e.g., plain text) in the body of the calendar invite message. In some embodiments, calendar service 134 can generate links for each attendance status response and add those links to the body of the calendar invite message.

When an invitee selects an attendance status (e.g., by selecting an attendance status option in a messaging client application user interface or by selecting a link corresponding to the attendance status) the calendar invite message can be updated by the invitee's messaging client application. For example, the calendar invite file can be updated to include the invitee's selected attendance status and the updated calendar invite file can be added to a response message and returned to the organizing user. In some embodiments, the invitee's messaging client application can update the invitee's calendar to include the calendar invite. For example, where the invitee's messaging client application includes, or is linked with, a calendar service, the invitee's calendar can be updated by the messaging client application sending a request to calendar service 130. In some embodiments, the messaging client application can send a request to the invitee's calendar service 130 (as represented by dashed arrow 136) where the messaging client application is not associated with a calendar service, or where the invitee uses a different calendar service. In some embodiments, the messaging client application can send a request to a calendar service application executing on the same client device (e.g., using a client device API, calendar service API, or other application interface) to update the invitee's calendar locally. In some embodiments, the calendar service application can communicate with calendar service 130 to update a web-based calendar that can be synced to the invitee's other client devices.

In some embodiments, message management service 104 can communicate with multiple clients to synchronize the events stored on those clients. Message management service 104 can maintain an event cache that stores received events (e.g., calendar invites) and data representing the user's attendance status (e.g., whether the invite was accepted, rejected, or marked tentative). The user's attendance status can be synced across clients, allowing users to see how they responded regardless of the client from which the initial response was sent. In some embodiments, message management service 104 can include a link to the user's calendar with, or in place of, the user's attendance status. When the link is selected, the current status of the invitation can be shown to the user from their calendar.

Clients 108 and 110 can be user-operated computing devices that can execute software to interact with calendar service 130, message management service 104, and/or messaging service 102. Various types of computing devices can be used, including desktop computers, laptop computers, tablet computers, smart phones, wearable computing devices, personal digital assistants, and so on. By way of example, client 108 can be a smart phone that can execute a messaging service application program (also referred to as a messaging app) to communicate with message management service 104 via network 106, and can execute a calendar application program (also referred to as a calendar app) to communicate with calendar service 130. The messaging app can be provided by a provider of message management service 104 and can be customized to allow users to view and respond to calendar invites received from different calendar and/or messaging service providers, without requiring the user to exit the messaging app and open a different app. For example, an interface of client 108 can be configured to allow the user to view and respond to calendar invites as described herein. Client 108 can display one or more user interfaces that can enable a user to view and respond to calendar invites. When a calendar invite is received from an organizing user, message management service 104 can parse the invite, according to the format of the invite, and provide the invitation details (time, date, location, etc.) to the messaging app such that the invite can be presented to the invitee in a user interface on client 108 in a consistent manner, regardless of what calendar or messaging service sent the invite. Client 108 can further receive a selection of an attendance status for the invite and communicate the selection to message management service 104. Message management service 104 can then prepare a response to the organizing user based on the selected attendance status. In some embodiments, message management service 104 can update the invitee's calendar by sending a request (as indicated by dashed arrow 132) to the invitee's calendar service 130 (e.g., using an API published by calendar service 130). In some embodiments, a user can operate another client 110 to view their attendance status for an invite to which the user responded from a different client, e.g., client 108.

In some embodiments, a client can display an interface (e.g., a graphical user interface) that enables a user to view and respond to calendar invites. Examples of interfaces are described below with reference to FIGS. 4-10.

Client 110 can be a desktop computer that can execute an app to communicate with messaging service 102 and/or message management service 104. This app can be, for example, a mail client app built into an operating system of a desktop computer, a web browser that interfaces with a web-based messaging service, a service-specific application provided by the provider of messaging service 102 or the provider of message management service 104, or another app. Client 110 can also execute a calendar app to communicate with calendar service 130.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104. In accordance with an embodiment, when the user responds to a calendar invite received through one messaging service account linked to the user message management service 104 account, message management service 104 responds to the calendar invite using the same messaging service account. In some embodiments, messaging service 102 can be associated with calendar service 134 such that the user's account with messaging service 102 is also associated with calendar service 134. In some embodiments, a user can have an account with calendar service 130 that is separate from the user's accounts with messaging service 102 and/or message management service 104.

Figure 2:
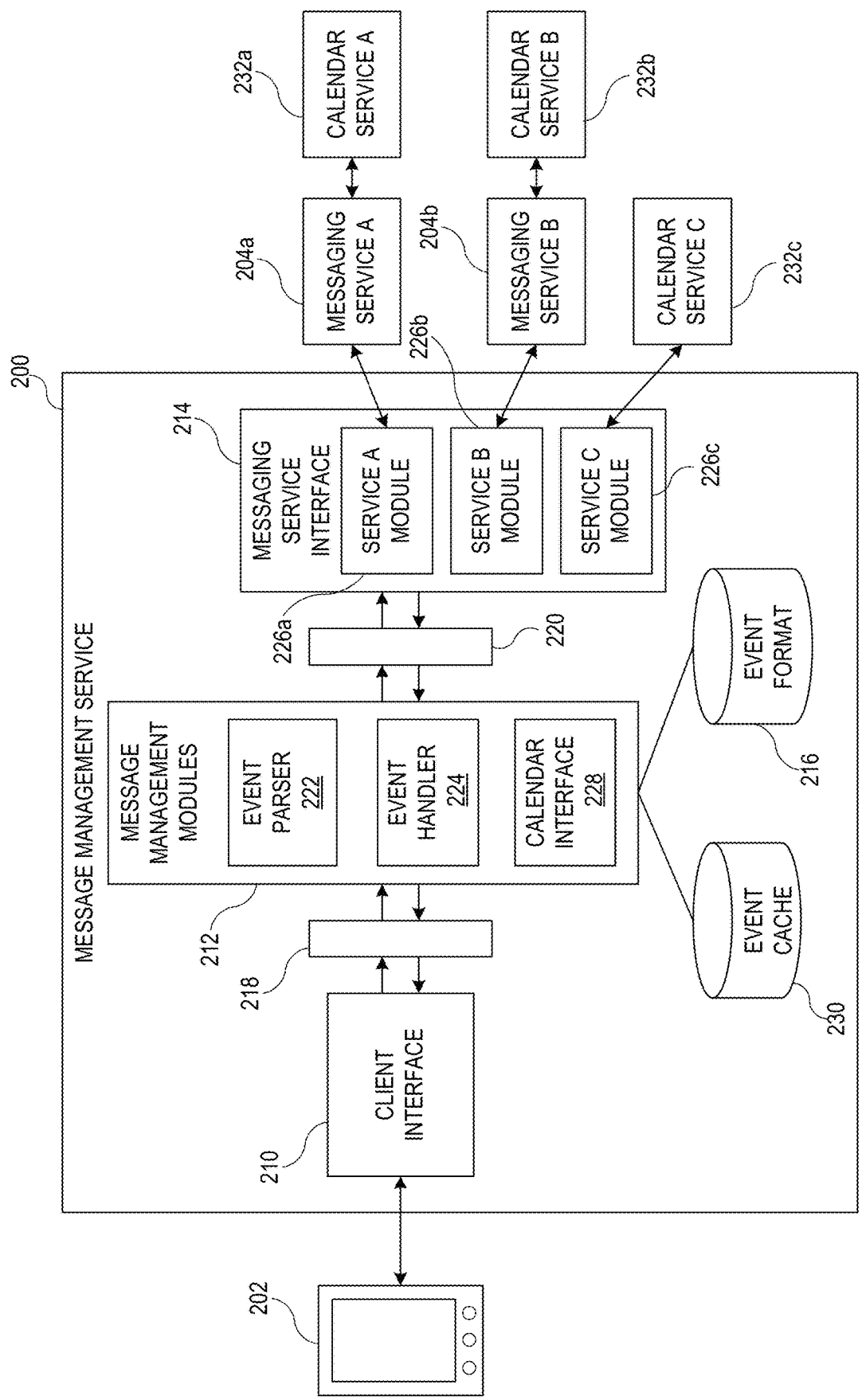
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between one or more clients, such as a client 202 (e.g., implementing client 108) and a client 206 (e.g., client 110 of FIG. 1), and various messaging services 204a, 204b (e.g., implementing messaging service 102 of FIG. 1), which can each be associated with a calendar service 232a, 232b (e.g., calendar service 134 of FIG. 1). In some embodiments, a calendar service (e.g., calendar service 232c) can interface with message management service 200 without an intervening messaging service (e.g., a calendar service that is not integrated with a messaging service). Each messaging service 204a, 204b can be a different messaging service, such as different email services, an email service and a social network service, and so on. While two messaging services 204 are shown, any number of messaging services 204 can be supported by a single message management service 200.

As described herein, calendar invites can be generated by a calendar service 232, communicated to one or more invitees as messages by a messaging service 204 and received by one or more client devices 102 associated with each invitee. Message management service 200 intermediates the messages (including the calendar invites) between the messaging services 204 and the clients 202. Although each calendar invite typically includes the same invitation details (time, date, location, etc.), each calendar service 232 and/or messaging service 204 can format the calendar invites or the corresponding messages differently. For example, some messaging services can provide selectable links for each attendance status option. The links can be embedded or associated with the invitation details as microdata. Some messaging services 204 can provide iCalendar (ICS) files, or other proprietary event files, that include invitation details for the calendar invite.

Message management service 200 can include a client interface 210, message management modules 212, a messaging service interface 214, event format cache 216, and event cache 230. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" invites from messaging services 204a, 204b and calendar services 232a, 232b, 232c to client 202, receive "outbound" invite responses from client 202, and/or receive various message processing instructions from client 202, such as instructions to defer a message.

Message management modules 212 can include functional blocks or modules configured to perform various operations on messages received by message management service 200, including outbound messages received from client 202 as well as inbound messages received from messaging services 204a, 204b and/or calendar services 232a, 232b, 232c. Message management modules 212 can be configured to perform one or more operations to handle calendar invites. For example, message management modules 212 can include event parser 222, event handler 224, and calendar interface 228.

Messaging service interface 214 can include various service modules 226a, 226b, 226c each of which can be configured to communicate with a different one of messaging services 204a, 204b or calendar services 232a, 232b, 232c. For example, different messaging services 204 and/or calendar services 232 can support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Event format cache 216 can be a database or other data store that includes format definitions for different calendar invites. Event format cache 216 can be indexed according to calendar service and or messaging service. When a calendar invite message is received from a given calendar service or messaging service, message management service 200 can retrieve a corresponding format definition from event format cache 216 and use the format definition to parse the invitation details from the calendar invite message.

Event cache 230 can be a database or other data store that stores invitation details for each calendar invite message received. In some embodiments, event cache 230 can store the attendance status received from the invitee with each event's invitation details. This allows message management service 200 to synchronize invitation details and attendance status across multiple client devices 202. In some embodiments, a request can be received from client device 202 at message management service 200 for a calendar invite history. Message management service 200 can query event cache 230 for invitation details and attendance status corresponding to calendar invites received during a particular time period (e.g., during a default time period, such as 30 days, or during a particular time period specified in the request). The calendar invite history can be returned to the client device for display. This enables users to view calendar invitation details, and their responses, without exiting the message management service client app.

In operation, message management service 200 can obtain inbound messages, including calendar invites, from messaging services 204 and provide the messages to client 202. Message management service 200 can also receive outbound messages (e.g., responses to the calendar invites) from client 202 and provide the messages to messaging service 204 for delivery to the recipient(s). Message management modules 212 can perform various operations on inbound and/or outbound messages.

In some embodiments, event parser 222, can process a calendar invite message received by message management service 200. Event parser 222 can identify the calendar invite from the calendar invite message (e.g., identify the ICS file, other calendar invite file, calendar invite links, etc.) and then parse the calendar invite based on the calendar invite format. As described above, event parser 222 can use a format definition corresponding to the messaging service or calendar service from which the calendar invite message was received to parse the calendar invite. After parsing the calendar invite, event parser 222 can pass the parsed invitation details to event handler 224.

In some embodiments, event handler 224 can receive the calendar invite and invitation details (e.g., from event parser 222, event cache 230, or other source), and format the invitation details for display on client device 202. In response, event handler 224 can receive an attendance status from the user. The attendance status can reflect that the user will, will not, or may be able to attend the event (e.g., by selecting "Yes", "No", or "Maybe"). Event handler 224 can modify the calendar invite to reflect the attendance status. In some embodiments, event handler 224 can use the format definitions stored in event format cache 216 to update the calendar invite. Event handler 224 can generate a calendar invite response message, including the updated calendar invite, and return the calendar invite response message to the organizing user through the calendar service or messaging service from which it was received. In some embodiments, where calendar or messaging services provide links for responding to the calendar invite, the event handler can select the link corresponding to the attendance status received from the client device 202, to return the appropriate calendar invite response.

In some embodiments, calendar interface 228 can communicate with any of a number of calendar services that are associated with an invitee. For example, when an invitee provides an attendance status indicating that the calendar invite has been accepted, calendar interface 228 can send a request to a calendar service (such as calendar service 130 of FIG. 1) to update the invitee's calendar appropriately. In some embodiments, calendar interface 228 can instruct the message management client app executing on client device 202 to update the invitee's calendar by interfacing with a calendar app executing on client device 202. The message management client app can interface with the calendar app using device-level, application-level, or other published APIs.

It will be appreciated that message management service 200 is illustrative and that variations and modifications are possible. For example, other message management modules and/or operations can be provided. In each of the above-described embodiments, a user can view, respond to, or otherwise interact with calendar invites through an interface built into the message management client app, without requiring the user to change apps, download calendar invites, or perform other actions outside of the message management client app, improving the user experience and simplifying the process of managing calendar invites.

Figure 3:
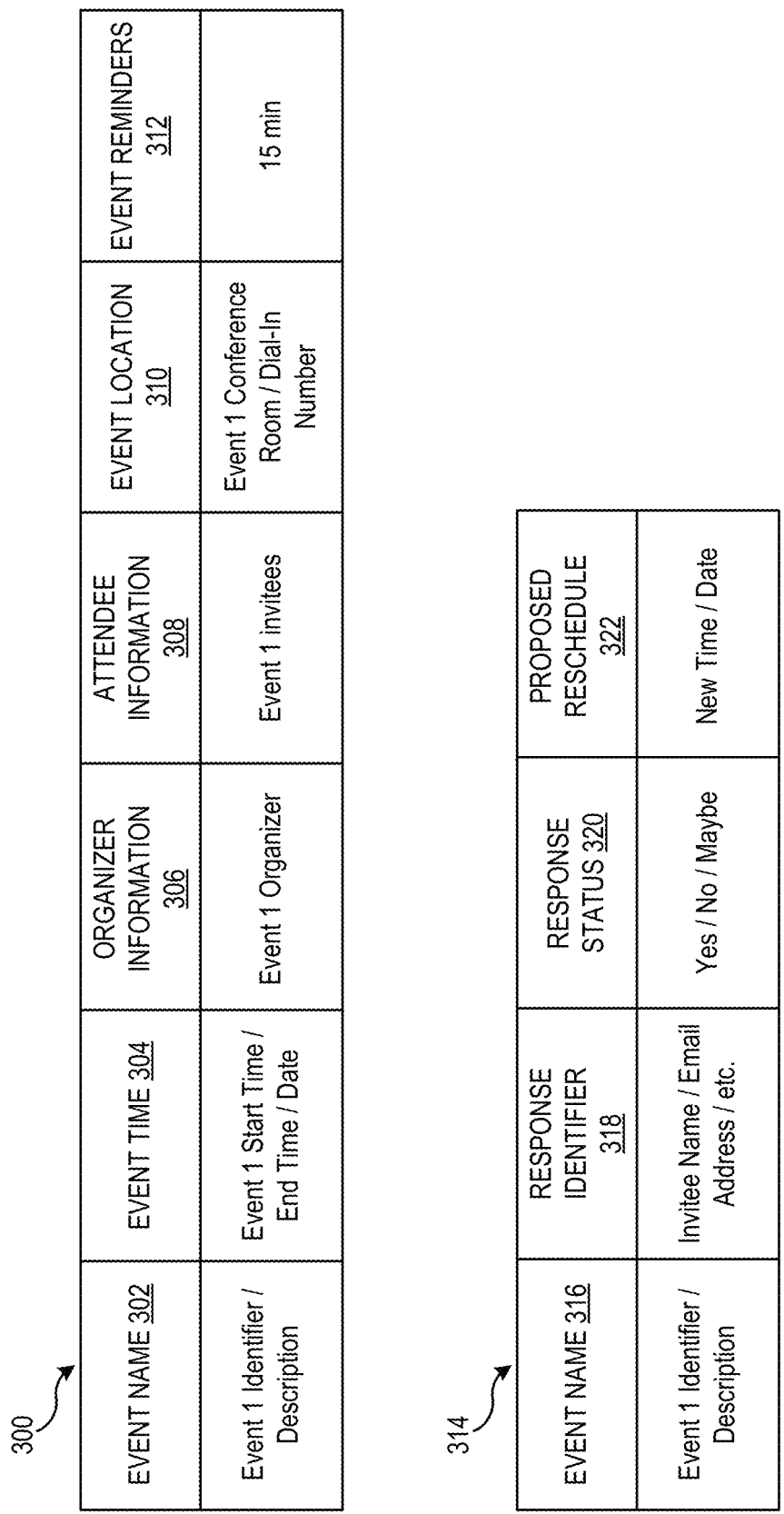
FIG. 3 shows a block diagram of various data structures for handling calendar invites according to an embodiment of the present invention.

FIG. 3 shows a block diagram of various data structures for handling calendar invites according to an embodiment of the present invention. The data structures shown in FIG. 3 represent the types of data that can be included in a calendar invite. The data shown in data structures 300 and 314 can be formatted differently, depending on the calendar service and/or messaging service from which the calendar invite is sent. For example, the data can be embedded as microdata with a corresponding message or can be included in an ICS file or other calendar file.

Data structure 300 can include data indicating an event name 302 which can include an identifier or description of the event. Data structure 300 can also include event time 304 which indicates a start time, end time, and date of the event. Data structure 300 can also include organizer information 306 (e.g., an email address or other identifier corresponding to the event organizer) and attendee information 308 (e.g., email addresses, names, or other information identifying who has been invited to the event). Event location 310 can include details of where the event is scheduled to occur (e.g., a city/state, conference room, telephone number, etc.). In some embodiments, event reminders 312 can be provided to automatically remind the user of the event (e.g., by playing an alert sound or displaying an event reminder) at a predefined time prior to the event.

Data structure 314 shows examples of response data that can be sent in response to a calendar invite. In some embodiments, the data shown in data structure 300 and data structure 314 can be included in a single data structure (e.g., an ICS file). Data structure 314 can include event name 316 which indicates the event to which the data in data structure 314 is responsive. A response identifier 318 can identify the user who is responding to the calendar invite (e.g., the user's name, email address, or other identifier). Response status 320 can include data indicating whether the user has accepted (e.g., "yes"), rejected (e.g., "no"), or responded tentatively (e.g., "maybe") to the calendar invite. In some embodiments, data structure 314 can include additional data fields, such as proposed reschedule data 322 indicating suggested alternative event details.

Figure 4:
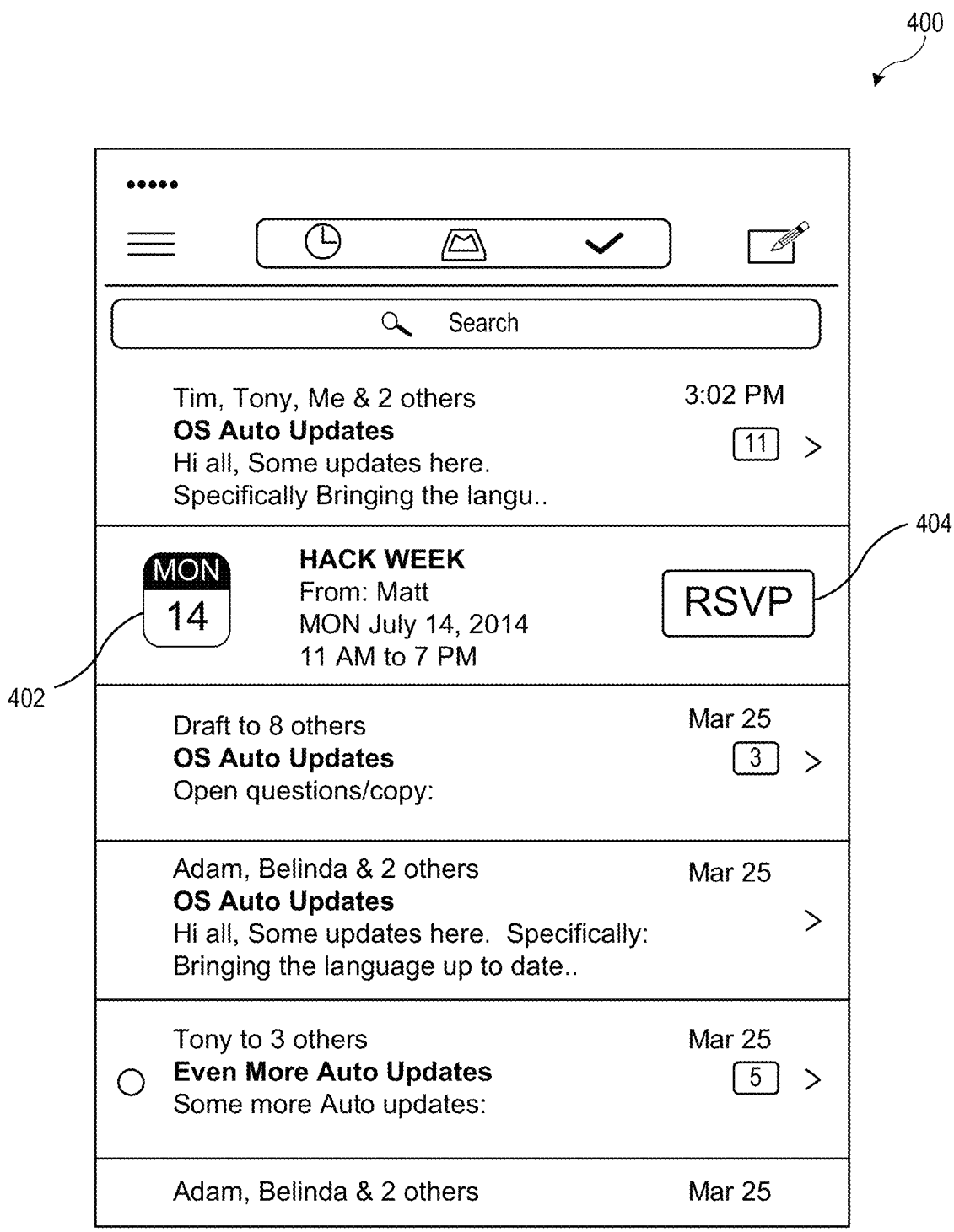
FIGS. 4-8 show examples of interfaces for handling calendar invites according to an embodiment of the present invention.

Examples of managing calendar invites in a message management client is described with reference to FIGS. 4-10. FIG. 4 shows an example of an interface (e.g., a graphical user interface) 400 that can be displayed on a client device (e.g., client 108 or client 110 of FIG. 1). As shown in interface 400, calendar invites can be shown in a user's inbox with other messages. A visual indicator 402 can visually differentiate the calendar invite from other messages displayed in the inbox. In some embodiments, the visual indicator 402 can indicate invitation details. For example, as shown in FIG. 4, visual indicator 402 can indicate the date of the event. In some embodiments, a visual indicator can indicate whether the calendar invite has been viewed and/or whether the user has responded. The calendar invite can include a selectable icon 404. In some embodiments, when selectable icon 404 is selected, an invitation details interface such as those shown in FIGS. 5-8 can be displayed.

Figure 5:
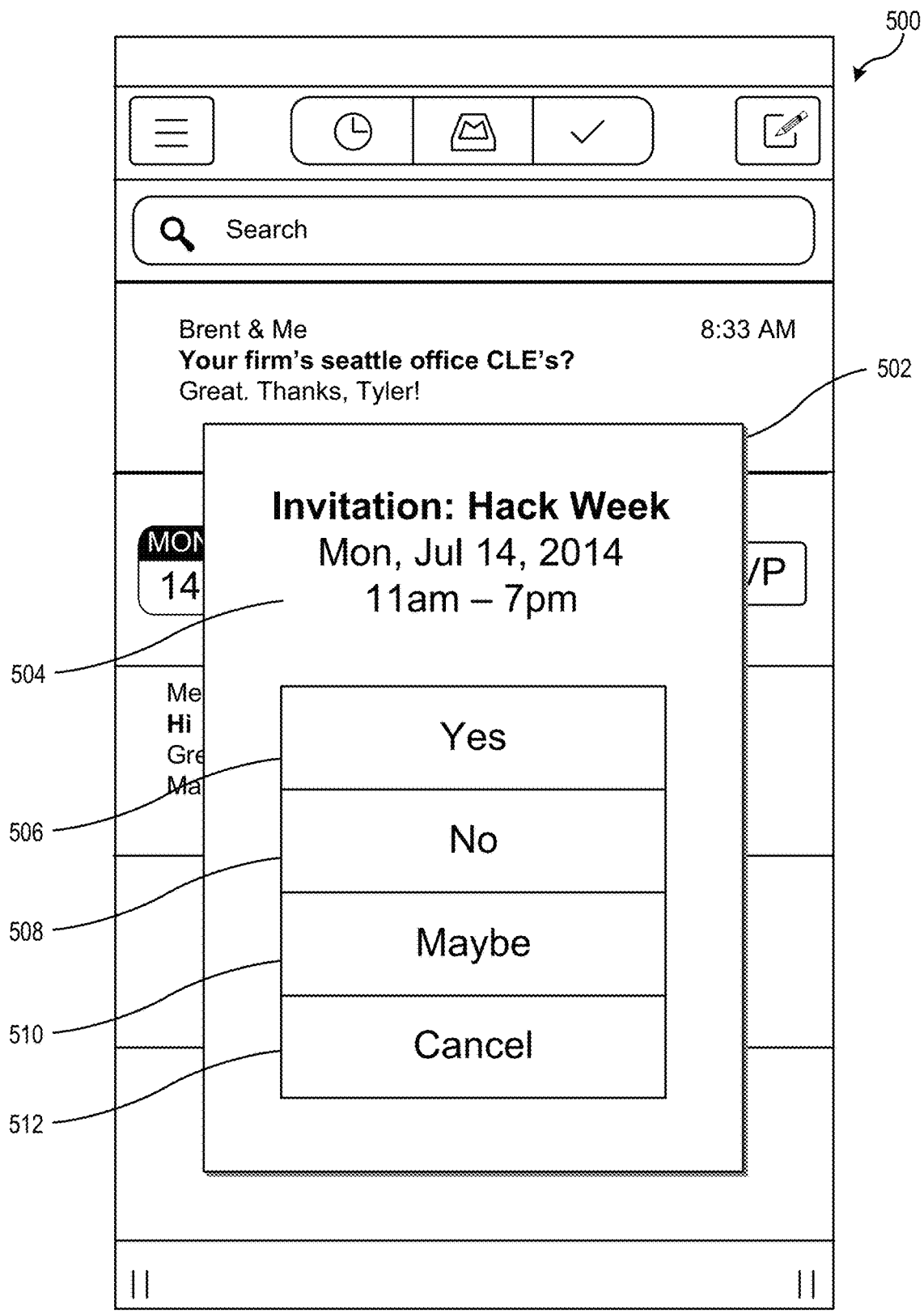

FIG. 5 shows an interface (e.g., a graphical user interface) 500 that can be displayed on a client device (e.g., client 108 or client 110 of FIG. 1). In some embodiments, interface 500 can be displayed in response to a user selecting a calendar invite from their inbox (e.g., as shown in interface 400). Interface 500 can present information about a calendar invite received from a message service 204 or calendar service 232. As described above, message management service 200 can parse the calendar invite based on an event format to determine invitation details for the calendar invite. The invitation details can then be presented in interface 500 in a consistent manner regardless of the message service or calendar service that sent the calendar invite. For example, as shown in FIG. 5, the invitation details can be shown in an overlay interface 502 that includes, at 504, an event name and description and event time, and selectable options for responding to the calendar invite (e.g., yes 506, no 508, maybe 510, or cancel 512).

In some embodiments, when a user selects one of the selectable options an event is generated corresponding to the selected option and sent to message management service 200. As described above, event handler 224 can receive the event and send a corresponding calendar invite response to the originating calendar service. For example, event handler 224 can modify the calendar invite file to reflect the selected attendance status, using the format definitions stored in event format cache 216, and send the updated calendar invite file to the organizing user through the calendar service or messaging service from which it was received. In some embodiments, where the originating calendar or messaging service provided links for responding to the calendar invite, the event handler can select the link corresponding to the attendance status received from the client device 202, to return the appropriate calendar invite response. Event handler can also update event cache 230 based on the selected attendance status and synchronize that event across multiple devices associated with the user.

Figure 6:
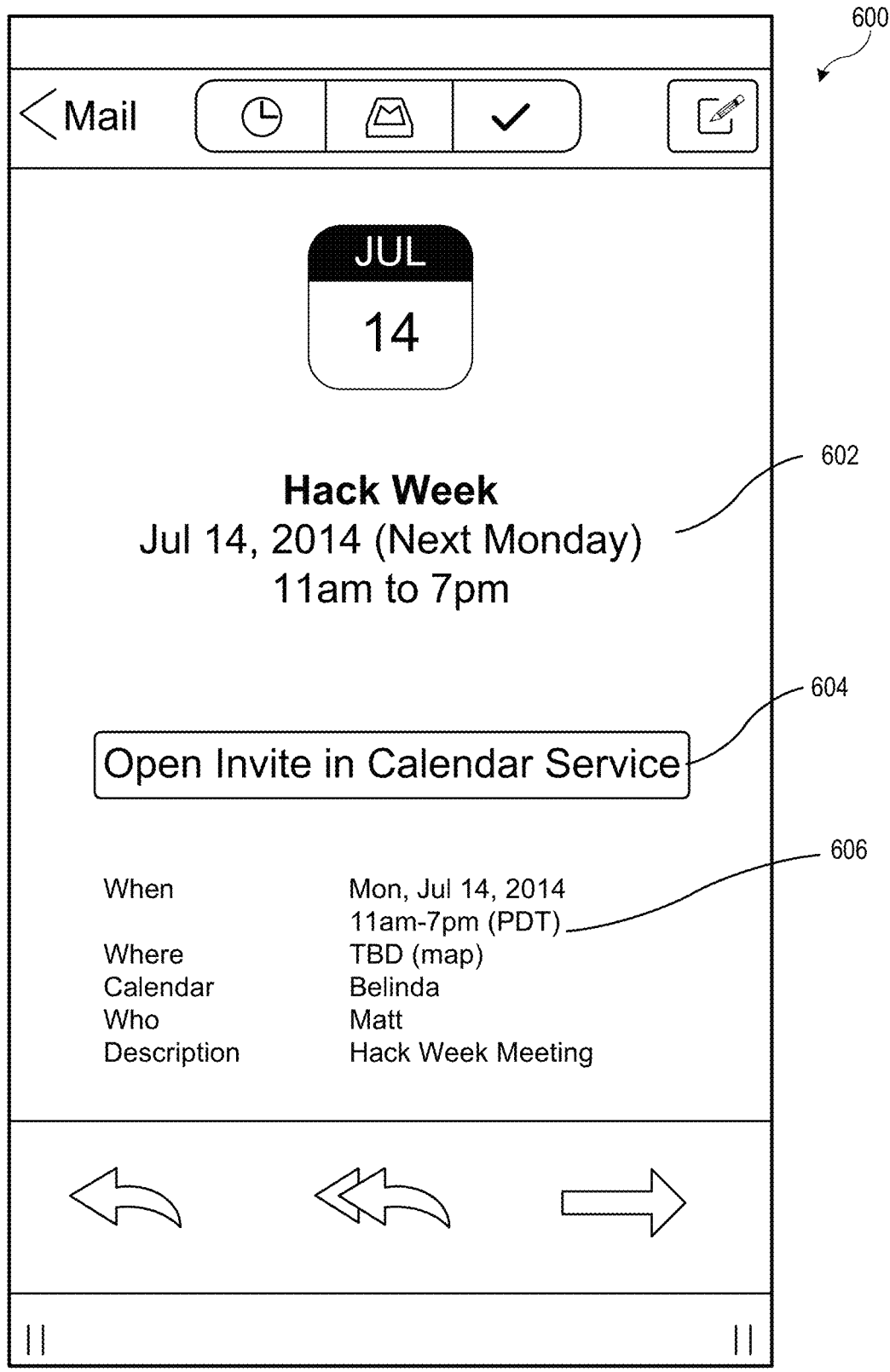
Figure 7:
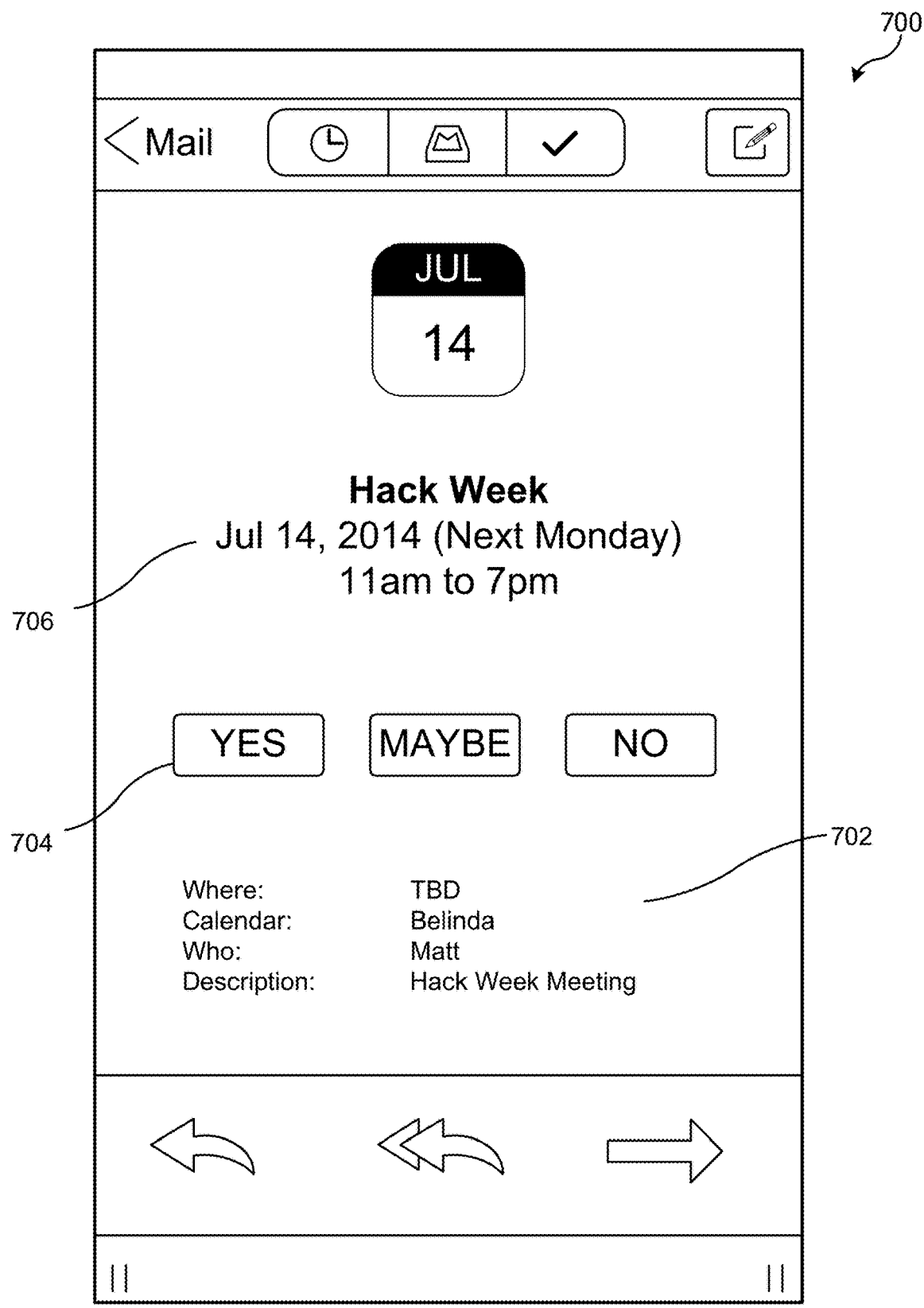
Figure 8:
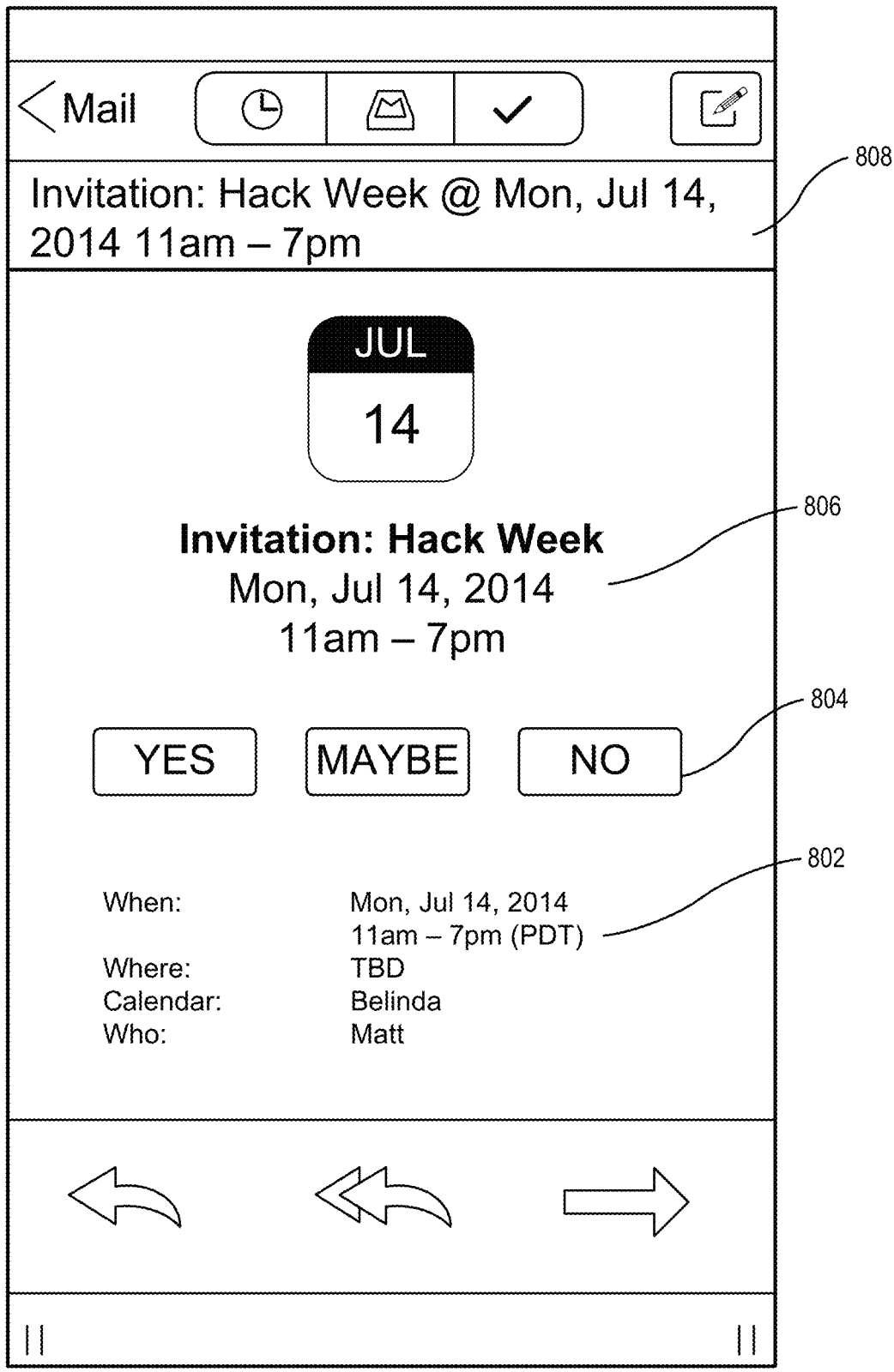

FIGS. 6-8 show examples of interfaces (e.g., a graphical user interface) 600, 700, 800, that can be displayed on a client device (e.g., client 108 or client 110 of FIG. 1). Each interface depicts different example embodiments in which an invitation details view of the calendar invite is shown. Unlike the overlay interface shown in FIG. 5, the invitation details views shown in FIGS. 6-8 can be full screen views that do not include other messages. As in FIG. 5, interfaces 600, 700, 800 can be displayed on client device 202 in response to the selection of a calendar invite in a user's inbox. In the example shown in FIG. 6, invitation details interface 600 can include a title 602 that includes an event name and event date/time. Invitation details interface 600 can also include a selectable link 604 to a calendar service. Invitation details can be displayed in the body 606 of invitation details interface 600. The invitation details can include the event date/time, event location, the invitee's name, the organizer's name, and a description of the event. In some embodiments, selectable link 604 can open a particular calendar service previously selected by the user. In some embodiments, selectable link 604 can cause a calendar selection interface (not shown) to be displayed to the user through which the user can select a calendar service to open an update.

FIG. 7 shows an alternative invitation details interface 700. The body 702 of invitation details interface 700 can include invitation details such as the event location, the invitee's name, the organizer's name, and a description of the event. Detail view 700 can also include several selectable links 704 which the user can select to indicate their attendance status (e.g., yes, no, or maybe). Title 706 can include the event name and event date/time. As described above, when one of the selectable links 704 is selected by the user, a corresponding event is generated and sent from client 202 to message management service 200. Based on the selected link, message management service 200 can update the calendar invite and return a corresponding response to the organizer, as described above. FIG. 8 show similar example interfaces to FIG. 7, including a body 802 including invitation details, selectable links 804 for responding to the calendar invite, and titles 806 including an event name and event date/time. FIG. 8 further includes title bar 808 which includes the subject line of the calendar invite message.

Figures 9A, 9B:
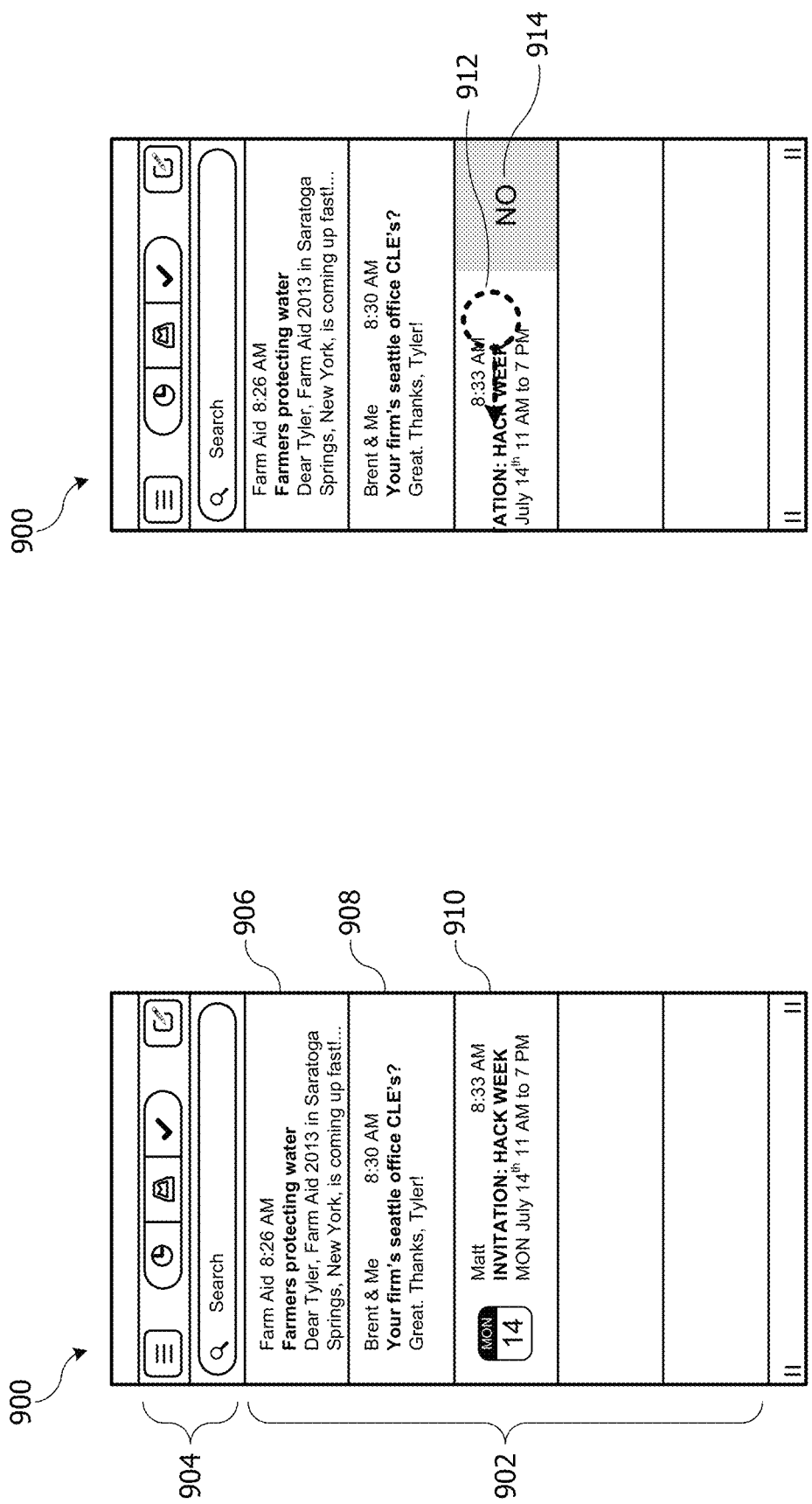
FIGS. 9A and 9B show an example of an interface for gesture-based management of calendar invites according to an embodiment of the present invention.

FIGS. 9A and 9B show an example of an interface 900 for gesture-based management of calendar invites according to an embodiment of the present invention. User interface screen 900 can include a message list 902 corresponding to the user's inbox. As described above, calendar invitation messages (such as message 910) can be displayed in a user interface with other messages (e.g., emails, text messages, and the like). A control section 904 can be provided to allow the user to take other actions, such as viewing previously created lists of messages, composing a message, searching messages, and so on. Message list 902 can include messages 906 and 908, and calendar invite 910. (In this example, message 906 is a most recent message in a thread of messages.) In this example, user interface screen 900 can provide a unified interface that allows the user to view a single list 902 that includes messages from all of the user's messaging-service accounts that are linked to message management service 200. In some embodiments, the client device can allow the user to select whether to view messages for all messaging-service accounts or fewer than all accounts (e.g., one account at a time).

User interface screen 900 can be presented on a touchscreen device, and the user can interact with message list 902 using touch gestures such as tapping or dragging. For instance, as shown in FIG. 9B, a user can drag calendar invite 910 partway to the left; gesture indicator 912 shows a contact point moving to the left, indicating dragging (also referred to herein as "swiping"). In some embodiments, the same gestures, when applied to a calendar invite can cause a different action to be performed than when applied to a message. For example, were gesture 914 to be applied to message 906 or 908, the gesture can cause the selected message to be deferred for later action, and this interpretation can be communicated to the user, e.g., by presenting a deferral icon. However, when applied to calendar invite 910 as shown in FIG. 9B, a left swipe can be interpreted by message management service 200 as a rejection of the invitation, and this interpretation can be communicated to the user, e.g., by presenting a rejection icon 914 as shown. In some embodiments, execution of gesture 912 can also result in user interface screen 900 presenting a menu (such as overlay interface 500 shown in FIG. 5) of options for how to respond to the rejection (e.g., to add an explanation for why the meeting is rejected, or to provide alternative event details). Other gestures can be defined to indicate other actions. For example, swiping to the right can cause the invitation to be accepted. In some embodiments the length of the swipe in a given direction can cause different actions to be performed. For example, swiping a first distance right can cause the invitation to be accepted, while swiping a second distance to the right can cause the invitation to be accepted tentatively. Regardless of the specific user action, client 202 can generate an event corresponding to the selected action, and send the event to message management service 200, and message management service 200 can generate a corresponding response to the calendar invitation and return it to the appropriate message service or calendar service.

Figure 10B:
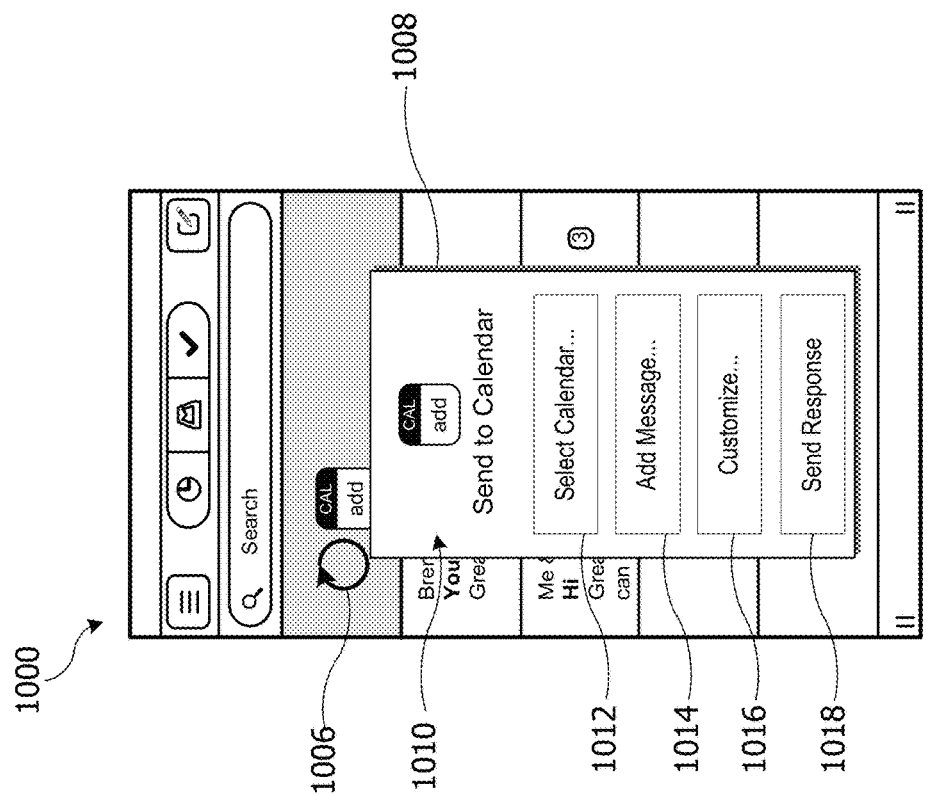
FIGS. 10A and 10B show an example of an interface for gesture-based management of calendar invites according to an embodiment of the present invention.
Figure 10A:
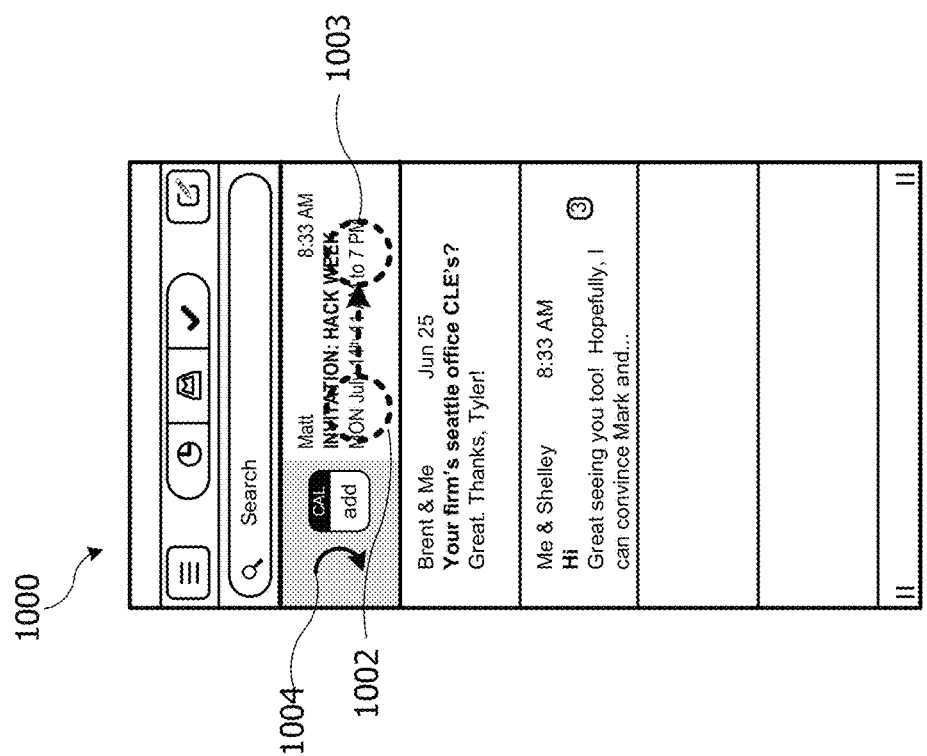

FIGS. 10A and 10B show an example of an interface 1000 for gesture-based management of calendar invites according to an embodiment of the present invention. As described above, in some embodiments, a user can make a swipe gesture to indicate a particular action to be performed on a calendar invite. For example, the swipe gesture can include the user making contact with the user interface 1000 at a contact point 1002 and then dragging the contact point in a particular direction. As described above, different actions can be associated with different directions and/or with the length of the user's swipe. For example, a swipe to the right that traverses a first distance of the screen of the user device can correspond to an accept action, whereas a swipe that traverses a second distance can correspond to a tentative accept action.

In the example shown in FIG. 10A, the user makes contact with user interface 1000 at contact point 1002 and swipes right, corresponding to an accept action. At contact point 1003 the user can hold the gesture to indicate that a related action is to be performed. This gesture can be referred to herein as a "swipe and hold" gesture. A time period can be defined during which the user maintains the hold to cause the related action to be performed. While holding, a timer and/or calendar visualization 1004 can be displayed. Timer and/or calendar visualization 1004 can both indicate the action associated with the swipe (in this example, a calendar "add" that corresponds to an accept action) and the time left (in this example, an arrowed line forming a circle). As shown in FIG. 10B, once the gesture has been held for the time period, a completed circle 1006 is displayed. In some embodiments, the selected message can also be replaced by an animation, or other action-appropriate visualization, indicating that the accept action has been performed on the selected message. An accept interface 1008, including an instruction message 1010, can then be displayed, prompting the user to provide information for responding to the calendar invite. As shown in FIG. 10B, the user can be prompted to select a calendar 1012 to which the event is to be added (for example, where the user has multiple calendar services linked to their account). In some embodiments, the user can add a message 1014 to be provided with the acceptance response and returned to the organizing user. In some embodiments, the user can customize 1016 the event details before the event is added to their calendar. For example, the user can choose to add or change the reminder time for the event, or add notes, directions, or other information related to the event.

In some embodiments, a calendar invitation can be received at a client device from a message management service. As described above, the calendar invitation can be displayed in an interface on the client device. For example, the calendar invitation can be displayed in a user's inbox (e.g., interface 400), as an overlay interface (e.g., interface 500), or as a full screen interface (e.g., interface 600, 700, 800). A selection of an attendance status can then be received from the user through the interface. For example, the user can select an option to open the invitation in a calendar service. In some embodiments, the user can be presented with selectable options corresponding to the user's attendance status (e.g., options 506-512, 704, or 804). In other embodiments, the user can select an attendance status on a touchscreen client device through a gesture-based interface, such as by swiping and/or swiping and holding, to select an attendance status (e.g., as described above with respect to FIGS. 9A, 9B, 10A, and 10B).

In some embodiments, based on the user's selected attendance status, another interface can be displayed through which a selection of attendance data can be received (e.g., interface 1008). The attendance data can include changes to the calendar invite (e.g., a proposed new time and/or location), a message to be sent with the calendar invite response, etc. A calendar response (e.g., an event) can then be returned to a message management service. The calendar response can include the attendance status and the selection of attendance data to the message management service.

In some embodiments, the attendance data can include a selection of a calendar service associated with the client device. Based on the selected calendar service, the message management service can return an instruction to the client device to add a calendar entry in a calendar application executing on the client device (e.g., using a device or application API as described above). In some embodiments, the selected calendar service can be a cloud-based calendar service such as calendar service 232a, 232b, 232c. An instruction to add a calendar entry associated with the selected calendar service can then be sent by the message management service to the selected calendar service.

Figure 11:
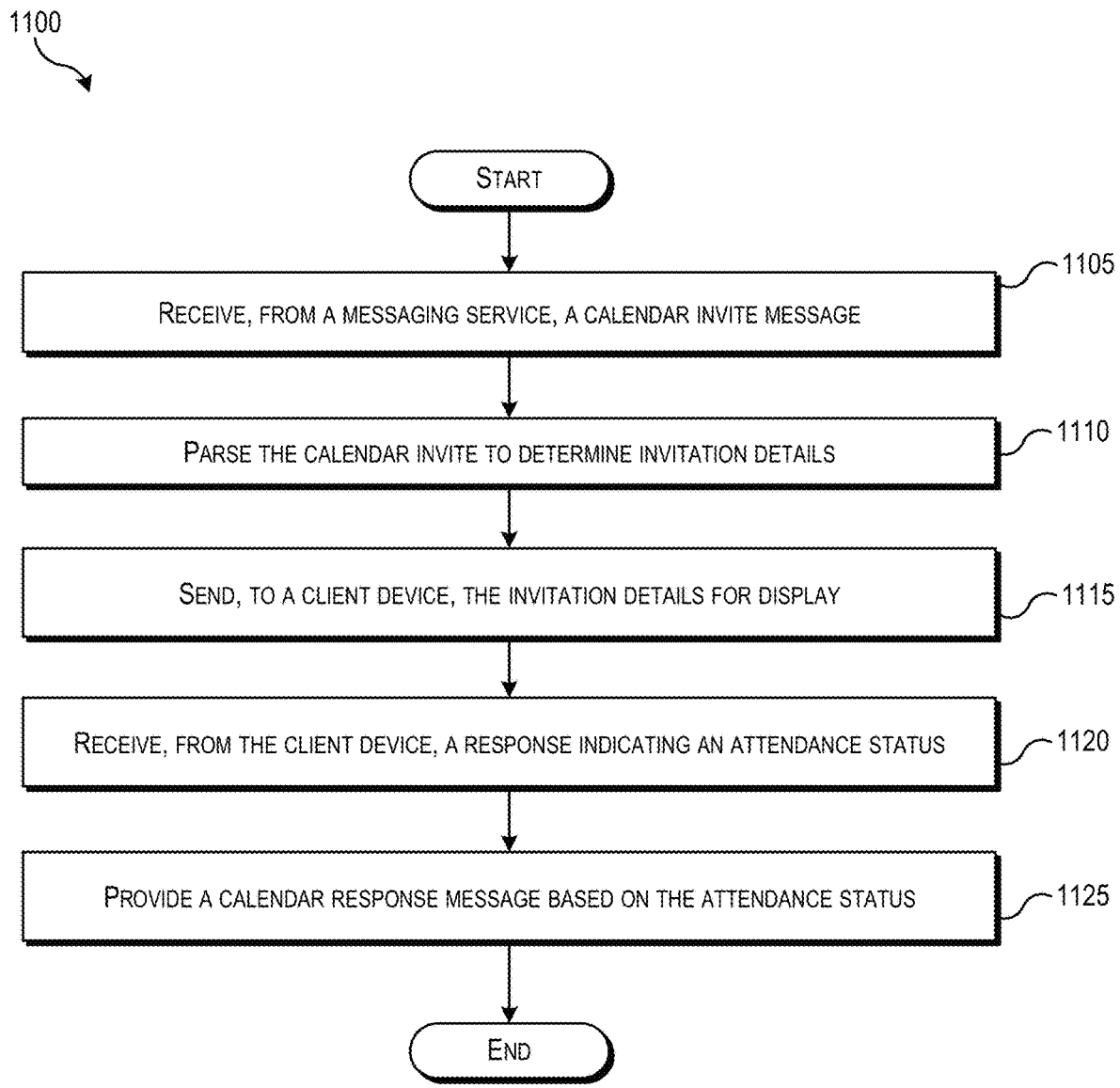
FIG. 11 is a flow diagram of a process for managing calendar invites according to an embodiment of the present invention.

FIG. 11 is a flow diagram of a process 1100 for managing calendar invites according to an embodiment of the present invention. Process 1100 can be performed by a message management service, such as message management service 200 of FIG. 2 or message management service 104 of FIG. 1.

At block 1105, a calendar invite message is received from a messaging service at a message management service. As described above, in some embodiments, the calendar invite can be received from a calendar service, messaging service, or other service provider. The calendar invite message can include a calendar invite file that defines the event and/or can include calendar invite links. Each calendar invite link and/or the calendar invite message can be associated with microdata that defines the event in addition, or as an alternative, to a calendar invite file.

At block 1110, the message management service can parse the calendar invite to determine invitation details for the event. As described above, the invitation details can include an event time/date, invitees, organizer, event location, and other details. The message management service can parse the calendar invite file based on a format associated with the messaging service and/or calendar service from which the calendar invite message was received. In some embodiments, the message management service can parse microdata associated with the calendar invite message or calendar invite links to identify invitation details.

At block 1115, the message management service can send the invitation details to the client device to be displayed. The message management service can format the invitation details that have been parsed from the messaging service format into a message management service format that can be displayed in a calendar invite user interface generated by the message management service client app executing on the client device. As described above, the calendar invite interface can display the invitation details and present several selectable options for responding to the calendar invite with an attendance status (e.g., selectable buttons or icons to accept, reject, or tentatively accept the invitation). In some embodiments, the calendar invite interface can receive a response from the user by detecting a gesture corresponding to an attendance status (e.g., accept or reject).

At block 1120, the message management service can receive a response indicating an attendance status. For example, as described above, the user can select a selectable option corresponding to their attendance status. In some embodiments, the user can select an attendance status through a gesture-based input (e.g., by swiping or swiping and holding the calendar invite in the user's inbox).

At block 1125, the message management service can provide a calendar response message based on the attendance status. For example, the message management service can edit the calendar invite file to include the attendance status or select a response link in the calendar invite corresponding to the attendance status.

In some embodiments, calendar response message, including the updated calendar invite file, can be provided to the messaging service or calendar service from which the calendar invite was received. In some embodiments, the message management service can generate a new message (e.g., an email) addressed to the organizing user, attach the updated calendar invite file to the message, and send the new message to the organizing user.

In some embodiments, the message management service can update the invitee's calendar directly, by communicating with a calendar service associated with the invitee, or through an interface on the client device. In some embodiments, the message management service can send a request to a remote calendar service (e.g., a web-based or cloud-based calendar service) to update a calendar associated with the client device based on the attendance status. Such a request can include credential information from the user to log-in to the remote calendar service and/or to provide authorization to the message management service to update the calendar associated with the user maintained by the remote calendar service.

It will be appreciated that process 1100 is illustrative and that variations and modifications are possible. Steps described as sequential can be executed in parallel, order of steps can be varied, and steps can be modified, combined, added or omitted. The processes can be performed by various computer systems, including a client computer system, a server computer system of a message management service, a server computer system of a messaging service, and/or a server computer system of an online content management service. In some embodiments, different portions of the processes can be performed by different computer systems.

While the invention has been described with respect to specific embodiments, one skilled in the art will recognize that numerous modifications are possible. For example, while the description above can make reference to email, the invention can be applied to any type of electronic message that can be stored and managed.

Figure 12:
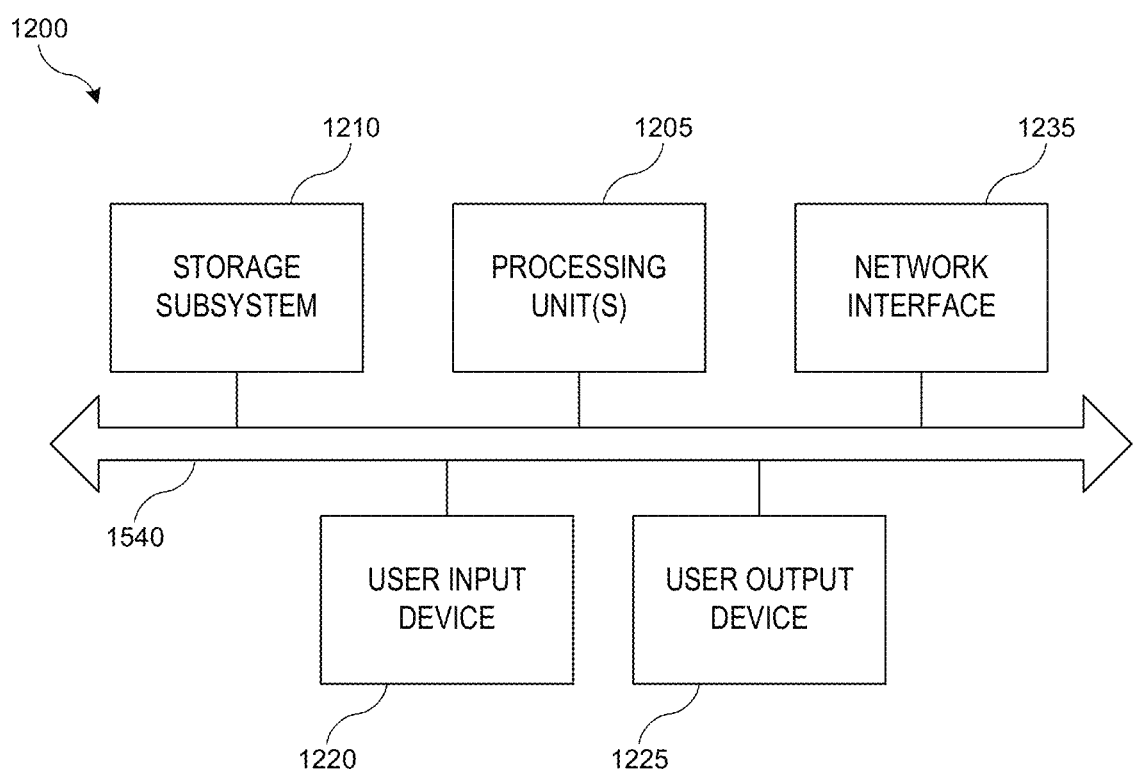
FIG. 12 shows a simplified block diagram of a representative computer system that can be used in an embodiment of the present invention.

Various operations described herein can be implemented on computer systems, which can include systems of generally conventional design. FIG. 12 shows a simplified block diagram of a representative computer system 1200. In various embodiments, computer system 1200 or similar systems can implement a user device (e.g., any of clients 108, 110 of FIG. 1) and/or a server system (e.g., servers implementing all or part of messaging service 102 and/or message management service 104 of FIG. 1). Computer system 1200 can include processing unit(s) 1205, storage subsystem 1210, input devices 1220, output devices 1225, network interface 1235, and bus 1240.

Processing unit(s) 1205 can include a single processor, which can have one or more cores, or multiple processors. In some embodiments, processing unit(s) 1205 can include a general-purpose primary processor as well as one or more special-purpose co-processors such as graphics processors, digital signal processors, or the like. In some embodiments, some or all processing units 1205 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1205 can execute instructions stored in storage subsystem 1210.

Storage subsystem 1210 can include various memory units such as a system memory, a read-only memory (ROM), and a permanent storage device. The ROM can store static data and instructions that are needed by processing unit(s) 1205 and other modules of computer system 1200. The permanent storage device can be a read-and-write memory device. This permanent storage device can be a non-volatile memory unit that stores instructions and data even when computer system 1200 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1205 need at runtime.

Storage subsystem 1210 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1210 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1210 can store one or more software programs to be executed by processing unit(s) 1205, such as an operating system, a messaging client application, and so on. "Software" refers generally to sequences of instructions that, when executed by processing unit(s) 1205, cause computer system 1200 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1205. Software can be implemented as a single program or a collection of separate programs or program modules that interact as desired. From storage subsystem 1210, processing unit(s) 1205 can retrieve program instructions to execute and data to process in order to execute various operations described herein.

A user interface can be provided by one or more user input devices 1220 and one or more user output devices 1225. Input devices 1220 can include any device via which a user can provide signals to computer system 1200; computer system 1200 can interpret the signals as indicative of particular user requests or information. In various embodiments, input devices 1220 can include any or all of a keyboard, track pad, touch screen, mouse or other pointing device, scroll wheel, click wheel, dial, button, switch, keypad, microphone, and so on.

User output devices 1225 can include any device via which computer system 1200 can provide information to a user. For example, user output devices 1225 can include a display to display images generated by computer system 1200. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1225 can be provided in addition to or instead of a display. Examples include indicator lights, speakers, tactile "display" devices, printers, and so on.

In some embodiments, input device 1220 and output devices 1225 can interoperate to provide a graphical user interface ("GUI") that allows a user to interact with computer system 1200 by using an input device to select a control element displayed on the screen (e.g., by operating a pointing device such as a mouse or touching the location where a control element is displayed on a touch screen).

Network interface 1235 can provide voice and/or data communication capability for computer system 1200, including the ability to communicate with various messaging services and/or message management services to access and act upon messages. In some embodiments, network interface 1235 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 1235 can provide wired network connectivity (e.g., Ethernet) in addition to or instead of a wireless interface. Network interface 1235 can be implemented using a combination of hardware (e.g., antennas, modulators/demodulators, encoders/decoders, and other analog and/or digital signal processing circuits) and software components.

Bus 1240 can include various system, peripheral, and chipset buses that communicatively connect the numerous components of computer system 1200. For example, bus 1240 can communicatively couple processing unit(s) 1205 with storage subsystem 1210. Bus 1240 can also connect to input devices 1220 and output devices 1225. Bus 1240 can also couple computing system 1200 to a network through network interface 1235. In this manner, computer system 1200 can be a part of a network of multiple computer systems (e.g., a local area network (LAN), a wide area network (WAN), an intranet, or a network of networks, such as the Internet. In some embodiments, bus 1240 and network interface 1235 can operate to connect any number of computers together to provide large-scale computing capacity (e.g., server farms) that can communicate with clients through a WAN interface (which can be part of network interface 1235).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1205 can provide various functionality for computer system 1200. For example, where computer system 1200 implements a client device, processing unit(s) 1205 can execute a messaging client app that provides an interface operable by the user to interact with messages, including, e.g., any or all of the interface screens described above. Where computer system 1200 implements a server (e.g., part or all of message management service 104 or messaging service 102 of FIG. 1), processing unit(s) 1205 can execute server applications that receive and respond to client requests and perform other operations described herein as being performable by a server or service.

It will be appreciated that computer system 1200 is illustrative and that variations and modifications are possible. Computer system 1200 can have other capabilities not specifically described here (e.g., mobile phone, global positioning system (GPS), power management, one or more cameras, various connection ports for connecting external devices or accessories, etc.). Further, while computer system 1200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    receiving, at a server of a message management service, a message from a messaging service remote from the message management service;
    identifying, by the server of the message management service, that the message is a calendar invite message by identifying a calendar invite link in the message; and
    based on identifying that the message is the calendar invite message:
        parsing, by the server of the message management service, the calendar invite message based on a format associated with the messaging service to identify invitation details;
        extracting, by the server of the message management service, the invitation details from the calendar invite message;
        generating, by the server of the message management service, an overlay interface that comprises the invitation details;
        sending, by the server of the message management service, the overlay interface comprising the invitation details to a client device to be displayed;
        receiving, by the server of the message management service, a response from the client device indicating an attendance status;
        providing, by the server of the message management service, a calendar response message based on the attendance status to the messaging service; and
        prompting, by the server of the message management service, a message management client application executing on the client device to update the attendance status by interfacing with a calendar application executing thereon.

2. The method of claim 1, wherein providing a calendar response message based on the attendance status to the messaging service further comprises:
    updating a calendar invite file corresponding to the calendar invite link based on the attendance status; and sending the calendar response message, including the updated calendar invite file, to the messaging service.

3. The method of claim 1, wherein providing a calendar response message based on the attendance status to the messaging service further comprises:
selecting a link of one or more links in the overlay interface, each link corresponding to the calendar invite link extracted from the calendar invite message and corresponding to the attendance status.

4. The method of claim 3, wherein the one or more links include a link to accept the invitation and a link to decline the invitation.

5. The method of claim 1, wherein prompting, by the server of the message management service, the message management client application executing on the client device to update the attendance status by interfacing with the calendar application executing thereon, comprises:
sending a request to a calendar service to update a calendar associated with the client device based on the attendance status.

6. The method of claim 1, wherein prompting, by the server of the message management service, the message management client application executing on the client device to update the attendance status by interfacing with the calendar application executing thereon, comprises:
sending a request to the client device to update a calendar associated with the client device based on the attendance status.

7. A computer system comprising:
one or more processors; and
a memory accessible to the one or more processors, the memory storing instructions executable by the one or more processors to:
receive a calendar invite message from a messaging service;
identify that the message is a calendar invite message by identifying a calendar invite link in the message; and
based on identifying that the message is the calendar invite message:
parse the calendar invite message based on a format associated with the messaging service to identify invitation details;
extract the invitation details from the calendar invite message;
generate an overlay interface that comprises the invitation details;
send the overlay interface comprising the invitation details to a client device to be displayed;
receive a response from the client device indicating an attendance status;
provide a calendar response message based on the attendance status to the messaging service; and
prompt a message management client application executing on the client device to update the attendance status by interfacing with a calendar application executing thereon.

8. The computer system of claim 7, wherein providing a calendar response message based on the attendance status to the messaging service further comprises:
updating a calendar invite file corresponding to the calendar invite link based on the attendance status; and
sending the calendar response message, including the updated calendar invite file, to the messaging service.

9. The computer system of claim 7, wherein providing a calendar response message based on the attendance status to the messaging service further comprises:
selecting a link of one or more links in the overlay interface, each link corresponding to the calendar invite link extracted from the calendar invite message and corresponding to the attendance status.

10. The computer system of claim 9, wherein the one or more links include a link to accept the invitation and a link to decline the invitation.

11. The computer system of claim 7, wherein prompting the message management client application executing on the client device to update the attendance status by interfacing with the calendar application executing thereon, comprises:
sending a request to a calendar service to update a calendar associated with the client device based on the attendance status.

12. The computer system of claim 7, wherein prompting the message management client application executing on the client device to update the attendance status by interfacing with the calendar application executing thereon, comprises:
sending a request to the client device to update a calendar associated with the client device based on the attendance status.

13. A method, comprising:
receiving a calendar invitation at a client device from a message management service, the calendar invitation corresponding to an incoming message from a messaging application that the message management service determines is a calendar invite message by identifying a calendar invite link in the incoming message, the calendar invitation non-native to a calendar application executing on the client device;
displaying the calendar invitation in a first interface on the client device, wherein the first interface is an overlay interface that includes invitation details extracted from the calendar invitation received at the message management service from the message service;
receiving a selection of an attendance status through the first interface;
in response to the selection, displaying a second interface on the client device;
receiving a selection of attendance data through the second interface on the client device;
sending a calendar response including the attendance status and the selection of attendance data to the message management service; and
prompting a message management client application executing on the client device to update the attendance status by interfacing with the calendar application executing thereon.

14. The method of claim 13, wherein the selection of attendance data includes a selection of a calendar service associated with the client device.

15. The method of claim 14, further comprising:
receiving an instruction to add a calendar entry in the calendar application executing on the client device, wherein the calendar application is associated with the selected calendar service.

16. The method of claim 14, wherein an instruction to add a calendar entry associated with the selected calendar service is sent by the message management service to the selected calendar service.

* * * * *